US005715179A

United States Patent [19]

Park

[11] Patent Number: 5,715,179

[45] Date of Patent: Feb. 3, 1998

[54] PERFORMANCE EVALUATION METHOD FOR USE IN A KARAOKE APPARATUS

[75] Inventor: Kyeong-Soo Park, Seoul, Rep. of Korea

[73] Assignee: Daewoo Electronics Co., Ltd, Seoul, Rep. of Korea

[21] Appl. No.: 610,318

[22] Filed: Mar. 4, 1996

[30] Foreign Application Priority Data

Mar. 31, 1995 [KR] Rep. of Korea ........................ 95-7270

[51] Int. Cl.[6] ............................... G06F 7/02; G09B 15/02

[52] U.S. Cl. ........................ 364/551.01; 364/410; 84/610; 84/609; 84/634; 369/53; 369/54; 434/307 A

[58] Field of Search ................................. 84/610, 477 R, 84/602, 634; 369/54, 53; 434/307 A; 364/551.01, 410

[56] References Cited

U.S. PATENT DOCUMENTS

| | | | |
|---|---|---|---|
| 5,287,789 | 2/1994 | Zimmerman | 84/477 R |
| 5,296,643 | 3/1994 | Kuo et al. | 434/307 A |
| 5,434,949 | 7/1995 | Joeng | 395/2.79 |
| 5,455,378 | 10/1995 | Paulson et al. | 84/610 |
| 5,477,003 | 12/1995 | Muraki et al. | 434/307 A |
| 5,511,053 | 4/1996 | Jae-Chang | 369/54 |
| 5,521,323 | 5/1996 | Pauson et al. | 84/610 |
| 5,525,062 | 6/1996 | Ogawa et al. | 434/307 A |
| 5,557,056 | 9/1996 | Hong et al. | 84/610 |

*Primary Examiner*—Emanuel T. Voeltz
*Assistant Examiner*—Tuan Q. Dam
*Attorney, Agent, or Firm*—Anderson Kill & Olick, P.C.

[57] ABSTRACT

A performance evaluation method for use in a karaoke apparatus evaluates a singing performance of a karaoke singer by measuring differences between the karaoke singer's vocal rendition and an accompanying music produced by an audiovisual device. Digitized voice signals and their corresponding digitized accompaniment signals are produced by sampling simultaneously the karaoke singer's vocal rendition and the accompanying music, respectively. Then, a difference between a digitized voice signal and its corresponding digitized accompaniment signal and a trend of differences are calculated and used to generate a performance score.

15 Claims, 3 Drawing Sheets

PERFORMANCE EVALUATION METHOD FOR USE IN A KARAOKE APPARATUS

FIELD OF THE INVENTION

The present invention relates to a performance evaluation method for use in a karaoke apparatus; and, more particularly, to a performance evaluation method capable of computing a performance score based on the performance of a karaoke singer.

DESCRIPTION OF THE PRIOR ART

As is well known, "karaoke" is a form of entertainment that has recently become popular in many countries, wherein a karaoke singer sings along to an accompanying music of a selected song. A karaoke apparatus is an electronic system employed for such sing-along activities. In its most basic form, the karaoke apparatus provides a microphone for the karaoke singer and displays lyrics or words of the selected song on a visual display device. While the karaoke singer sings the song following the displayed lyrics, the karaoke apparatus outputs his or her vocal rendition and the accompanying music to an audio output device, e.g., a set of speakers.

To enhance the entertainment value of karaoke, a typical karaoke apparatus also includes a performance evaluator which generates a score. The performance evaluator employed in the existing karaoke apparatus normally contains pre-recorded scores in a Read-Only-Memory ("ROM") device. Upon the selection of a particular song, the performance evaluator is activated by the transmission of the accompanying music thereto. Thereafter, when the accompanying music is ended, the performance evaluator randomly selects any one of the pre-recorded scores and transmits the selected score to the display.

However, because the score is unrelated to the actual performance of the karaoke singer, the scoring system is not only unreliable but also fails to enhance the entertainment value of the karaoke apparatus.

SUMMARY OF THE INVENTION

It is, therefore, a primary object of the present invention to provide a method for evaluating a karaoke singer's performance by measuring an incongruity between the karaoke singer's vocal rendition and a corresponding accompanying music of a selected song.

In accordance with a preferred embodiment of the present invention, there is provided a method for use in a karaoke apparatus for evaluating the performance of a karaoke singer, wherein the karaoke apparatus includes means for providing an accompanying music signal of a selected song and means for converting a karaoke singer's vocal rendition into a voice signal, the method comprising the steps of: (a) detecting a start of the selected song; (b) waiting for a predetermined period after detecting the start of the selected song and, thereafter, simultaneously sampling the voice signal and the accompanying music signal at a predetermined sampling rate to thereby generate a temporal sequence of pairs of one digitized voice signal and a corresponding digitized accompaniment signal; (c) setting an initial cycle count $n_0$ at 1 in response to a first pair of digitized voice and digitized accompaniment signals generated after the predetermined period; (d) measuring a difference D(n) between a digitized voice signal VV(n) and a digitized accompaniment signal VA(n) that constitute the pair of digitized voice and digitized accompaniment signals corresponding to $n=n_0$; (e) computing a cycle score S(n) based on the difference D(n); (f) incrementing the initial cycle count $n_0$ by one for a next pair of digitized voice and digitized accompaniment signals and repeating said steps (d) and (e) until the selected song is ended; and (g) generating a performance result PR calculated based on the cycle scores computed in said step (e).

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
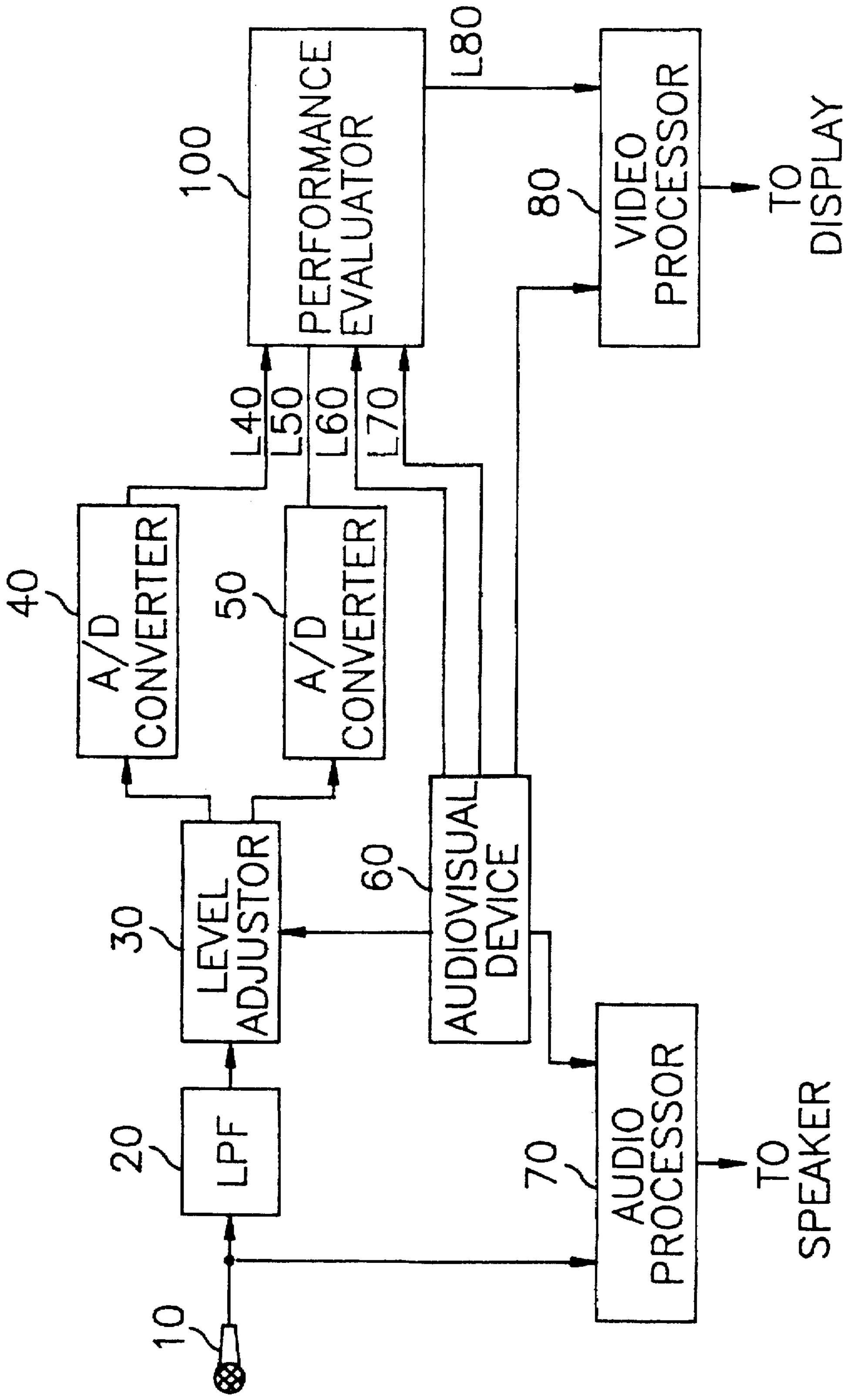
FIG. 1 shows a block diagram of an inventive karaoke apparatus for evaluating the performance of a karaoke singer.

Referring to FIG. 1, there is shown a block diagram of a karaoke apparatus for evaluating the performance of a karaoke singer in accordance with the present invention. The karaoke apparatus comprises a microphone 10, an audiovisual device 60, an audio processor 70, a video processor 80, and a performance evaluator 100. The audiovisual device 60 incorporated in the karaoke apparatus has a plurality of songs, including their lyrics and accompanying music, recorded therein, allowing the karaoke singer to select any one of them through the use of an appropriate selection device (not shown). Once the karaoke singer makes his or her choice, the audiovisual device 60 provides an accompanying music signal for the selected song to the audio processor 70 to be outputted via a set of speakers (not shown). In addition, the audiovisual device 60 provides a video signal to the video processor 80, allowing the video processor 80 to display the lyrics of the selected song through a display (not shown). The audiovisual device 60 may also be furnished with the capability of providing a background scene signal to the video processor 80, thereby allowing a background scene to be displayed concurrently with the lyrics of the selected song.

In addition, the audiovisual device 60 also provides to the performance evaluator 100 a start signal via a line L60 when a selected song begins, and an end signal via a line L70 when the selected song ends.

A vocal rendition of the song, provided by the karaoke singer, is converted into an electrical voice signal by the microphone 10. The electrical voice signal is then outputted to the audio processor 70. Thus, the audio processor 70 concurrently outputs the karaoke singer's vocal rendition and the accompanying music reproduced from the audiovisual device 60 to the speaker. The speaker and the display allow the karaoke singer to hear his or her own singing accompanied by the accompanying music while viewing the background scene and reading the lyrics of the song.

The electrical voice signal from the microphone 10 is also supplied to a low pass filter ("LPF") 20 wherein its high frequency components are removed. Subsequently, after removal of the high frequency components, the filtered electrical voice signal is transmitted to a level adjustor 30.

Meanwhile, the accompanying music signal from the audiovisual device 60 is also provided to the level adjustor 30. The level adjustor 30 thus receives the filtered electrical voice signal from the LPF 20 and the accompanying music signal from the audiovisual device 60 and ensures that a peak-to-peak voltage of both are the same. In other words, the level adjustor 30 makes it sure that maximum and minimum possible voltages of the filtered electrical voice signal and the accompanying music signal are the same, for the purpose of facilitating a comparison between the two signals that is carried out at the performance evaluator 100.

The adjusted electrical voice signal and the adjusted accompanying music signal are then provided to a first analog to digital ("A/D") converter 40 and a second A/D converter 50, respectively. The adjusted electrical voice signal is converted by the first A/D converter 40 into digitized voice signals while the adjusted accompanying music signal is converted into digitized accompaniment signals by the second A/D converter 50. It should be noted that, to make the comparison of the digitized voice signals and the digitized accompaniment signals carried out at the performance evaluator 100 more meaningful, the adjusted electrical voice signal and the adjusted accompanying music signal are sampled simultaneously, and at a same rate, so as to enable the first and second A/D converters 40, 50, to generate the digitized voice signals and the digitized accompaniment signals synchronously in a temporal sequence.

The digitized voice signals and the digitized accompaniment signals are then provided to the performance evaluator 100 via a line L40 and a line L50, respectively. Subsequently, the performance evaluator 100 begins a performance evaluation process, comparing the digitized voice signals with the digitized accompaniment signals in pairs to produce a performance result PR, and outputting same to the video processor 80 via the line L80 for the display thereof.

Figure 2:
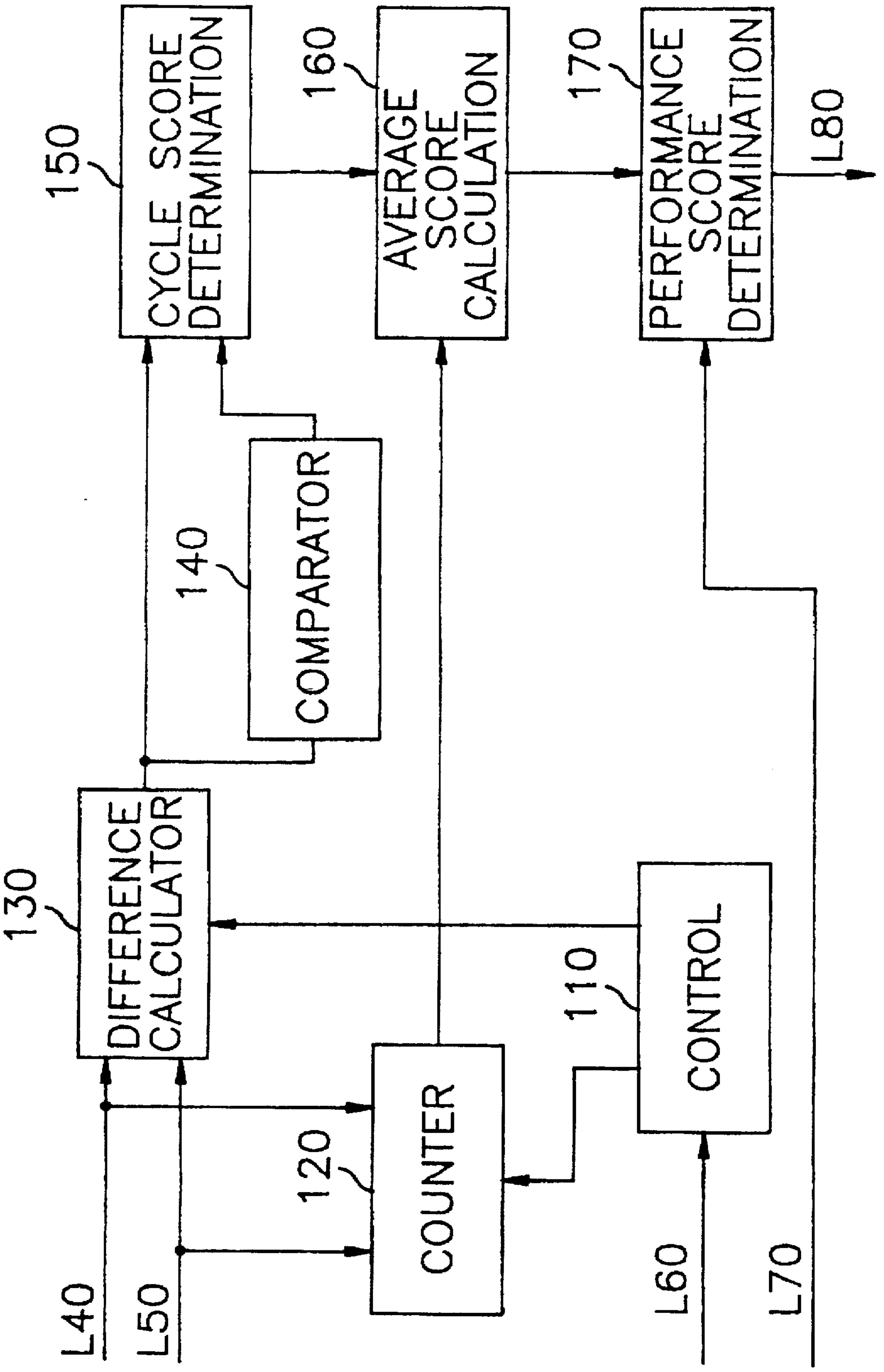
FIG. 2 provides a detailed block diagram of a performance evaluator incorporated in the inventive karaoke apparatus shown in FIG. 1.

FIG. 2 is a detailed block diagram illustrating the performance evaluator 100 incorporated in the karaoke apparatus in accordance with a preferred embodiment of the present invention. The performance evaluator 100 includes a control block 110, a counter 120, a difference calculator 130, a comparator 140, a cycle score determination block 150, an average score calculation block 160, and a performance score determination block 170.

It should be noted that, for the sake of simplicity, one full cycle of process that the performance evaluator 100 carries out each time a digitized voice signal and its corresponding digitized accompaniment signal are received through the lines L40 and L50, respectively, is referred to as one scoring cycle in the present specification.

In response to the start signal from the audiovisual device 60 received through the line L60, the control block 110 generates an initiation signal. Since most songs have an initial "instruments only" period where the singer does not sing, it may be preferable to design the control block 110 to wait for an appropriate time period from the reception of the start signal before generating the initiation signal.

The initiation signal generated by the control block 110 is then provided to the counter 120 and the difference calculator 130, thereby initiating the operation thereof. In response to the initiation signal from the control block 110, the counter 120 first sets a cycle count n to zero and increases the cycle count n by one every time a pair of digitized voice signal and digitized accompaniment signal is received. In effect, the cycle count n keeps track of how many scoring cycles have elapsed. The counter 120 outputs the cycle count n to the average score calculation block 160.

Meanwhile, in response to the initiation signal from the control block 110, the difference calculator 130 calculates a difference D(n) between each digitized voice signal received through the line L40 and the corresponding digitized accompaniment signal received through the line L50. The difference D(n) may be defined as:

$$D(n)=|VV(n)-VA(n)| \quad \text{Eq. 1}$$

wherein VV(n) is a voltage level of an nth digitized voice signal, and VA(n) is a voltage level of an nth digitized accompaniment signal, n being a positive integer.

The difference D(n) generated at the difference calculator 130 is provided to both the comparator 140 and the cycle score determination block 150. The comparator 140 generates a comparison signal based on whether the difference D(n) is larger or smaller than a predetermined threshold value X and provides, to the cycle score determination block 150, e.g., a logic high comparison signal if D(n) is larger than X and a logic low signal if otherwise.

The cycle score determination block 150 calculates a cycle score S(n) for the scoring cycle n based on the difference D(n) and the comparison signal. Specifically, if the logic high comparison signal is applied to the cycle score determination block 150 from the comparator 140, the cycle score S(n) is given a penalty value Y as follows:

$$S(n)=Y \quad \text{Eq. 2}$$

wherein Y is a negative number.

Alternatively, if the comparison signal applied thereto is a logic low, representing D(n) being equal to or smaller than X, a trend of differences TD(n) may be obtained as follows:

$$TD(n)=0, \text{ if } n=1$$

$$TD(n)=|D(n-1)-D(n)|, \text{ otherwise} \quad \text{Eq. 3}$$

wherein D(n−1) is the difference between the (n−1)st digitized voice signal and the (n−1)st digitized accompaniment signal, and D(n) is the difference between the nth digitized voice signal and the nth digitized accompaniment signal. If the current scoring cycle is the first cycle, i.e., the count n has a value of 1, the trend TD is given a value of 0.

Next, the cycle score S(n) may be given a value inversely proportional to the trend TD(n), determined, e.g., by using:

$$S(n)=\frac{A}{B+TD(n)}, \text{ or} \quad \text{Eq. 4}$$

$$S(n)=ae^{-bTD(n)}$$

wherein A, B, a and b are constants. Thus, a predetermined highest possible value for S(n) would result in response to a lowest possible value of TD(n), i.e., 0. Proportionally lower values would be assigned to S(n) in response to higher values of TD(n). The cycle score determination block 150 then provides the cycle score S(n) to the average score calculation block 160.

In response, each time the cycle score S(n) is received, the average score calculation block 160 calculates and stores an average score AS(n). The average score AS(n) may be defined as follows:

$$AS(n)=\frac{S(n)+(n-1)AS(n-1)}{n} \quad \text{Eq. 5}$$

wherein AS(n) is an average score of all the cycle scores S(n)'s obtained so far and AS(n−1) is an average of all the cycle scores up to S(n−1). Subsequently, the average score calculation block 160 provides the average score AS(n) to the performance score determination block 170.

The performance score determination block 170 computes and updates a performance score PS(n) in response to the average score AS(n) provided by the average score calculation block 160. The performance score PS(n) may be calculated as follows:

$$PS(n)=BS+AS(n) \quad \text{Eq. 6}$$

wherein BS is a base score.

If the end signal is received from the audiovisual device 60 via the line L70, the performance score determination block 170 outputs the performance score PS(n) to the video signal processor 80 via the line L80 as the performance result PR, thereby allowing it to be shown on the display.

Figure 3:
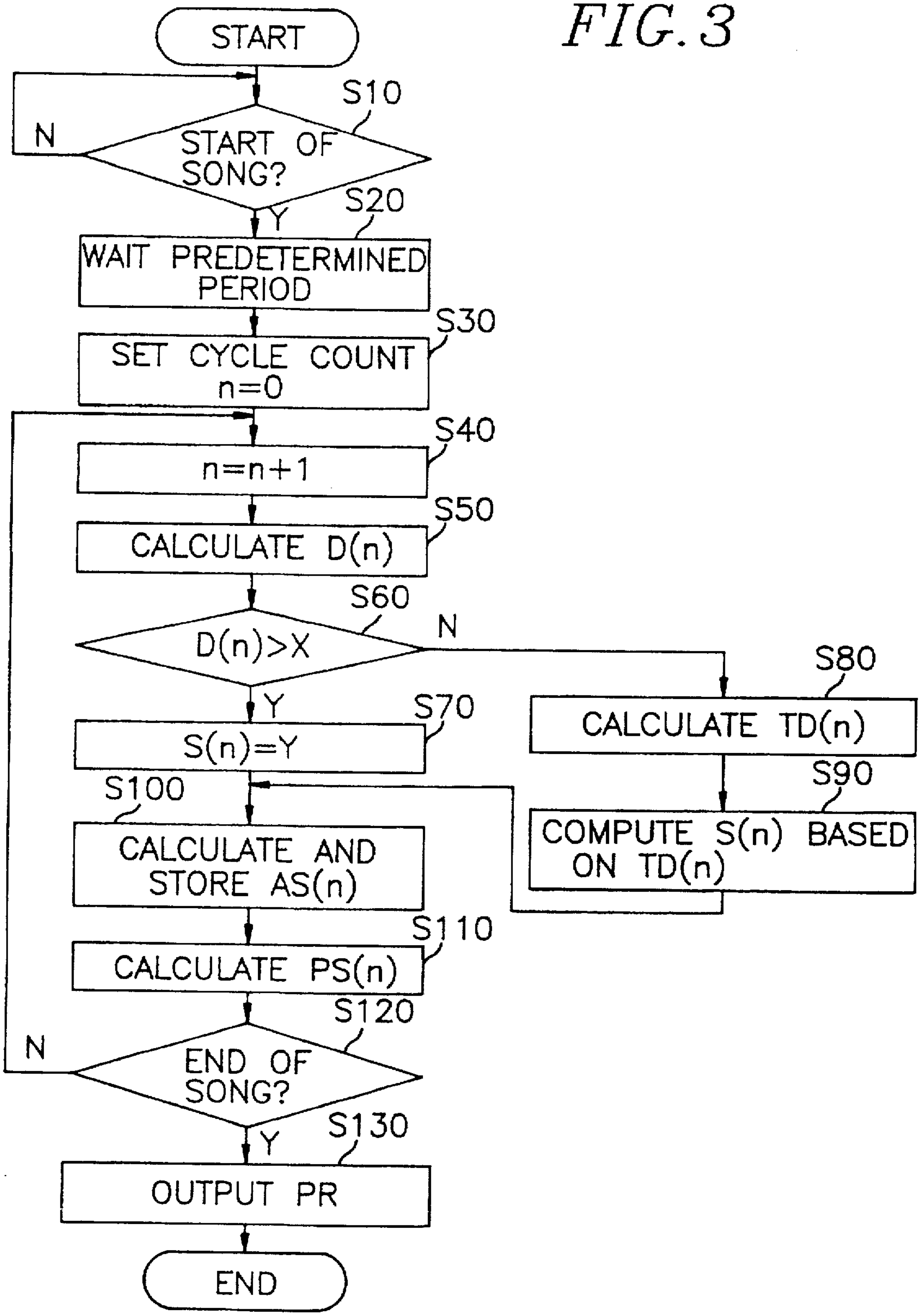
FIG. 3 represents a flowchart illustrating the inventive method for generating a performance score employed in the karaoke apparatus.

Referring to FIG. 3, there is illustrated a score computation method carried out in the performance evaluator 100 shown in FIG. 1 in accordance with the present invention.

At a start of the performance evaluation process, in step S10, the performance evaluator 100 first waits until a new song begins. If the performance evaluator detects that the new song has begun, i.e., if the start signal from the audiovisual device 60 is received, the performance evaluator 100 proceeds to step S20 and waits for a predetermined length of time, i.e., until the karaoke singer is supposed to start singing. In the next step, S30, the cycle count n is set to zero. Subsequently, in step S40, if a digitized voice and/or accompaniment signal is provided thereto, the cycle count is increased by one. The cycle count n is used to keep track of how many scoring cycles have elapsed. Thus, during the first scoring cycle, the cycle count n would have a value of one; during the second scoring cycle it would have a value of two, and during an ith scoring cycle, it would have a value of i.

After the performance evaluator 100 updates the cycle count n, it proceeds to step S50 and measures, as defined in Eq. 1, the difference D(n) between the nth digitized voice signal and the nth digitized accompaniment signal.

Subsequently, in step S60, the difference D(n) is compared with a predetermined threshold value X. If D(n) is larger than X, the performance evaluator 100 then proceeds to step S70. In step S70, the cycle score S(n) is given the penalty value Y as defined in Eq. 2.

On the other hand, if D(n) is equal to or smaller than X, the performance evaluator 100 proceeds to step S80. In step S80, the trend of differences TD is obtained by taking the absolute value of the difference between D(n) and D(n−1) as defined in Eq. 3.

Next, in step S90, the cycle score S(n) is given a value inversely proportional to the trend TD(n). Thus, a predetermined highest possible value for S(n), e.g., A/B, would result in case of the lowest possible value of TD(n), i.e., 0, in accordance with Eq. 4. Proportionally lower values would be given to S(n) in response to higher values of TD(n).

Subsequently, in step S100, the average score AS(n) is calculated in accordance with Eq. 5. The range of possible scores AS can be manipulated by choosing appropriate values for A, B (or a, b), BS, X and Y.

After the cycle score S(n) has been computed in either step S70 or step S90, and used to adjust the average score AS(n) in step S100, the performance evaluator 100 proceeds to step S110, wherein the performance score PS(n) for the nth scoring cycle is obtained. The performance score PS(n) is obtained by simply adding a current average score AS(n) to the base score BS. Since the average score AS(n) could have a negative value, the base score BS is added to ensure that the performance score PS(n) will always be positive or above a certain minimum score. Thereafter, the procedure goes to step S120 and checks to see whether the song has ended. If the song is not over, the performance evaluator returns to step S40 to begin a next scoring cycle.

However, if the performance evaluator 100 detects in step S120 that the song is over, it proceeds, instead, to step S130, wherein the performance score PS(n) is outputted to the video processor 80 as the performance result PR.

The score computation method described above takes into account not only how much the vocal rendition provided by the karaoke singer deviates from the accompanying music, but also how consistent such deviation, or the performance, is.

While the present invention has been shown and described above with respect to the particular embodiments, it will be apparent to those skilled in the art that many changes, alterations and modifications may be made without departing from the spirit and scope of the invention as defined in the appended claims.

What is claimed is:

1. A method for use in a karaoke apparatus for evaluating a performance of a karaoke singer, wherein the karaoke apparatus includes means for providing an accompanying music signal of a selected song and means for converting a karaoke singer's vocal rendition of the selected song into a vocal signal, the method comprising the steps of:

(a) detecting a start of the selected song;

(b) waiting for a predetermined time and, thereafter, digitizing the vocal signal and the accompanying music signal to provide a sequence of digitized voice signals and a sequence of digitized accompaniment signals, respectively;

(c) setting a cycle count n at 1 in response to at least one of a first digitized voice and a first digitized accompaniment signal;

(d) measuring an nth difference D(n) between an nth digitized voice signal and an nth digitized accompaniment signal;

(e) calculating an nth cycle score S(n) as a predetermined function of the difference D(n);

(f) generating an nth average score AS(n) for the nth digitized voice and the nth accompaniment signals, the nth average score AS(n) representing an average value of S(i)'s with i being 1 to n;

(g) computing an nth performance score PS(n) for the digitized voice and the nth accompaniment signals based on the average score AS(n);

(h) incrementing the cycle count n by one upon receiving at least one of a next digitized voice signal and a next digitized accompaniment signal and repeating said steps (d) to (g) until the selected song is ended; and (i) producing, as a performance result PR, the performance score PS(n) computed last in said step (g).

2. The method of claim 1, wherein said difference D(n) is defined as:

$$D(n)=|VV(n)-VA(n)|$$

wherein VV(n) and VA(n) represent the nth digitized voice signal and the nth digitized accompaniment signal, respectively.

3. The method of claim 2, wherein if the difference D(n) is larger than a predetermined threshold value X, said cycle score S(n) is defined as:

$$S(n)=Y$$

wherein Y is a predetermined penalty having a negative value; and, if the difference D(n) is equal to or smaller than the predetermined threshold value X, said cycle score S(n) is defined in such a manner that the cycle score S(n) decreases as an nth trend TD(n) increases, the trend TD(n) being defined as:

$$TD(n)=0, \text{ if } n-1; \text{ and}$$

$$TD(n)=|D(n-1)-D(n)|, \text{ if otherwise.}$$

4. The method of claim 3, wherein if the difference D(n) is equal to or smaller than the predetermined threshold value X, said cycle score S(n) is defined as:

$$S(n)=A/(B+TD(n))$$

wherein A and B are predetermined constants, respectively.

5. The method of claim 4, wherein said nth average score AS(n) is defined as:

$$AS(n)=(S(n)+(n-1)AS(n-1))/n$$

wherein AS(n−1) is an (n−1)st average score.

6. The method of claim 5, wherein said performance score PS(n) is defined as:

$$PS(n)=BS+AS(n)$$

wherein BS is a predetermined base score.

7. The method of claim 3, wherein if the difference D(n) is equal to or smaller than the predetermined threshold value X, said cycle score S(n) is defined as:

$$S(n)=ae^{-bTD(n)}$$

wherein a and b are predetermined constants, respectively.

8. The method of claim 7, wherein said nth average score AS(n) is defined as:

$$AS(n)=(S(n)+(n-1)AS(n-1))/n$$

wherein AS(n−1) is an (n−1)st average score.

9. The method of claim 8, wherein said performance score PS(n) is defined as:

$$PS(n)=BS+AS(n)$$

wherein BS is a predetermined base score.

10. The method of claim 1, further comprising, after said detecting step (a), the step of (a1) adjusting voltage levels of the vocal signal and the accompanying music signal to make a maximum and a minimum possible voltage levels of the vocal signal become identical to those of the accompanying music signal, respectively.

11. The method of claim 10, wherein said difference D(n) is defined as:

$$D(n)=|VV(n)-VA(n)|$$

wherein VV(n) end VA(n) represent the nth digitized voice signal end the nth digitized accompaniment signal, respectively.

12. The method of claim 11, wherein if the difference D(n) is larger than a predetermined threshold value X, said cycle score S(n) is defined as:

$$S(n)=Y$$

wherein Y is a predetermined penalty having a negative value; and, if the difference D(n) is equal to or smaller than the predetermined threshold value X, said cycle score S(n) is defined in such a manner that the cycle score S(n) decreases as an nth trend TD(n) increases, the trend TD(n) being defined as:

$$TD(n)=0, \text{ if } n=1; \text{ and}$$

$$TD(n)=|D(n-1)-D(n)|, \text{ if otherwise.}$$

13. The method of claim 12, wherein if the difference D(n) is equal to or smaller then the predetermined threshold value X, said cycle score S(n) is defined as:

$$S(n)=ae^{-bTD(n)}$$

wherein a and b are predetermined constants, respectively.

14. The method of claim 13, wherein said nth average score AS(n) is defined as:

$$AS(n)=(S(n)+(n-1)AS(n-1))/n$$

wherein AS(n−1) is an (n−1)st average score.

15. The method of claim 14, wherein said performance score PS(n) is defined as:

$$PS(n)=BS+AS(n)$$

wherein BS is a predetermined base score.

* * * * *